UNITED STATES PATENT OFFICE.

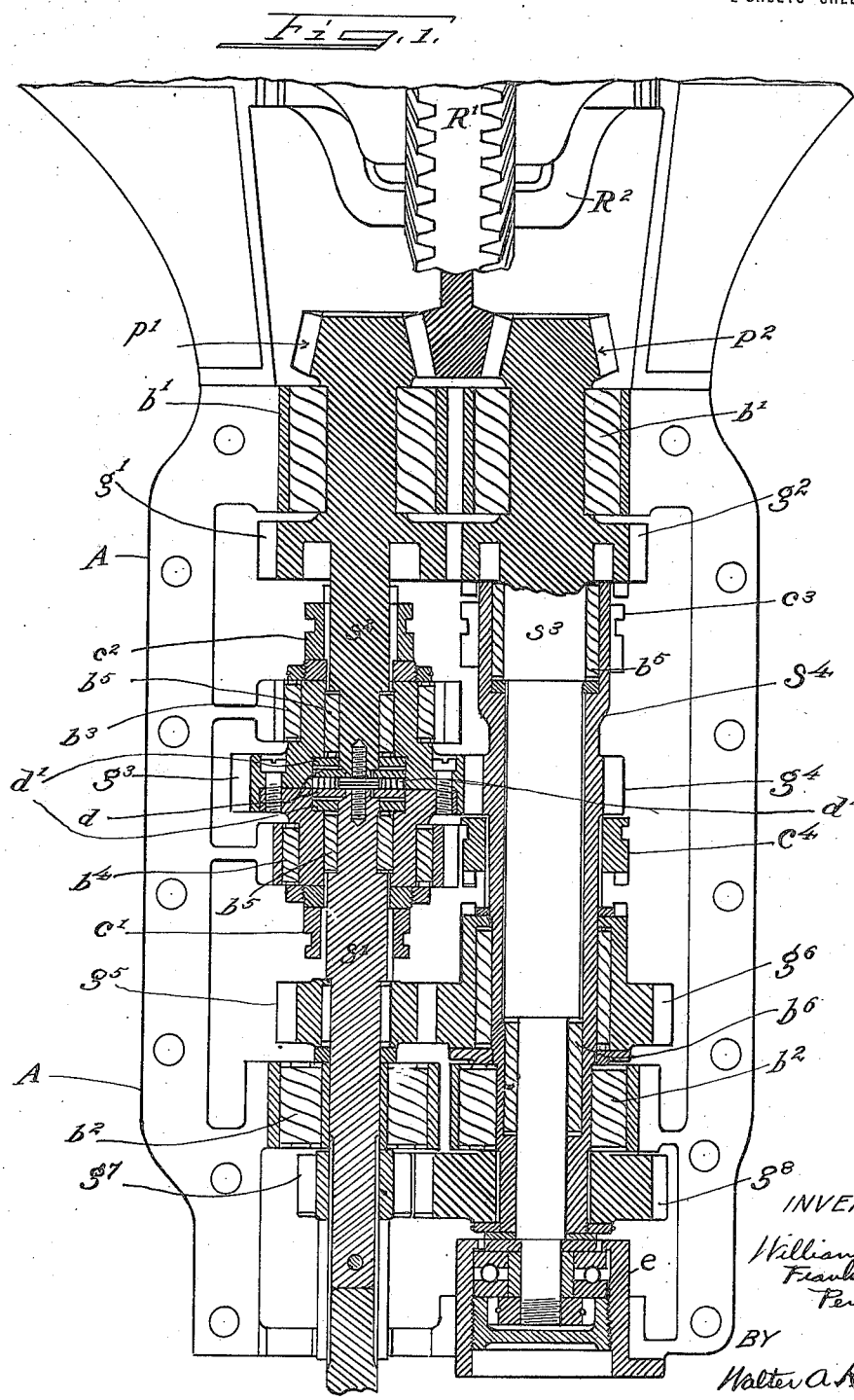

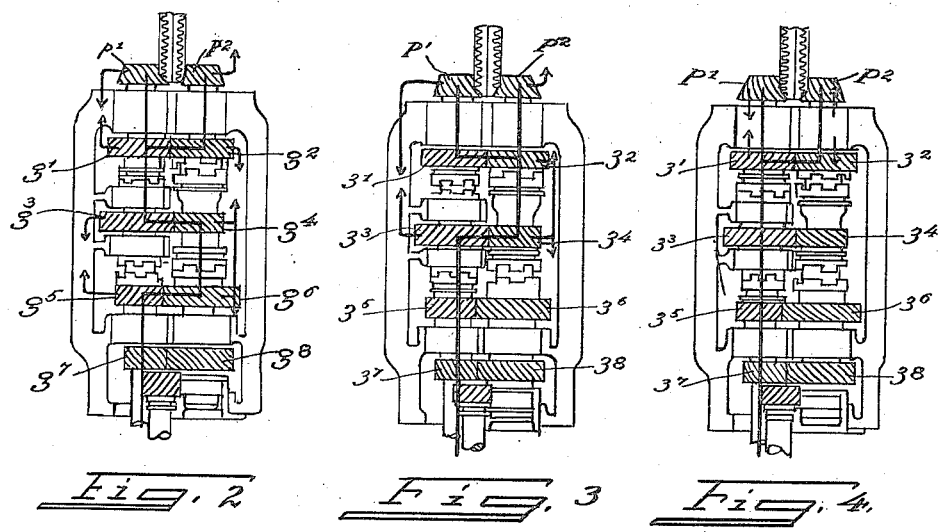

WILLIAM FRANKLIN PENROD, OF CINCINNATI, OHIO, ASSIGNOR TO ANTHONY J. WISSEL, TRUSTEE.

TRANSMISSION-GEAR SYSTEM.

1,424,210. Specification of Letters Patent. Patented Aug. 1, 1922.

Application filed April 15, 1921. Serial No. 461,564.

*To all whom it may concern:*

Be it known that I, WILLIAM FRANKLIN PENROD, a citizen of the United States, residing at Cincinnati, in the county of Hamilton and State of Ohio, have invented new and useful Improvements in Transmission-Gear Systems, of which the following is a specification.

My invention relates to power-transmitting gear systems such as are used in automotive vehicles; its object being the improvement of the structure and operative relationship of the elements composing the same, tending, primarily, to simplicity of structure, reduction of initial cost and a more economical use of power, on the one hand, and increased efficiency and durability on the other.

The improvement also contemplates an increased range of applicability by the system and arrangement of change gears and operative elements whereby the improved system is adapted to use both with automotive trucks and also to passenger car service; and in both with smooth and practically noiseless operation.

To these and cognate ends, the invention consists:

1. In a driving and transmitting system embodying the application of power to an ultimately driven shaft or axle, through parallel shafts arranged at right angles to said ultimate shaft, by gears provided with helical teeth so inclined and related as to produce opposing and neutralizing end thrusts absorbed by the gears involved, in all speed changes; thereby rendering special thrust bearings unnecessary by a relation practically realizing a "herring bone" tooth system of gear operation and eliminating all extra strains on the case or case bearings.

2. In a structure and relation of parts wherein more direct speeds are realized with fewer transmission elements than are attained in standard practice.

3. In a structure and arrangement of parts whereby the driving power is delivered by two thrust balanced bevel pinions simultaneously, at opposite sides to a ring gear with self-adjusting equalization of load carried thereby.

Further details will appear in the specification following.

In the drawings forming part of this specification, Figure 1 is a plan view of a system of change gearing embodying my invention, sectioned through the common plane of both the driving and driven shafts; and Figures 2 to 6 inclusive, are plan views, in the nature of diagrams, showing the direction of power transmission in the several speed changes and gear connections; indicating by the arrows the direction of the end thrusts created, illustrating the principle of balancing by opposing thrusts confined to the gears involved as a matter of tooth pressures. Fig. 2 is low gear. Fig. 3 is over geared, that is for drive of bevel pinions at greater than engine speeed. Fig. 4 is direct or engine speed drive. Fig. 5 is intermediate drive. Fig. 6 is the reverse.

Referring now to the accompanying drawings, A designates a supporting frame for the mechanism herein described, provided with suitable bearings for a main or initial power shaft $S^1$; an axially abutting and independently rotatable extension thereof designated as the extension shaft $S^2$; and an auxiliary shaft $S^3$, in parallel relations with those first mentioned.

The extension shaft $S^2$, and the auxiliary shaft $S^3$, carry equal terminal bevel pinions $p^1$, $p^2$, in constant driving relations with a double-toothed ring gear $R^1$, fixedly attached to the differential casing $R^2$, of the driven axle (not shown). Immediately forward of the pinions $p^1$, $p^2$, are located supporting bearings $b^1$, $b^1$, for the extension and auxiliary shafts, and adjacent to these bearings are a pair of equal constant mesh spur gears $g^1$, $g^2$,—one upon each of said shafts. The combined structure of bevel-pinions, shafts and intermeshing spur gears of each shaft regarded as a whole and as carried by the intervening bearings $b^1$ in common, constitute a unit of structure and may be integral as to each shaft respectively. The system contemplates an equal division of power between the driving pinions and their immediate shafts at all times, by which the normal stress upon and wear of parts is minimized by distribution between the two pinions.

The contiguous end-portions of the main and extension shafts are of somewhat reduced diameter and are carried in abutting relations in pilot bearings $b^4$ $b^5$ within an axial perforation through a spur gear $g^3$ and its laterally extended hubs which are themselves carried in case bearings $b^3$, $b^4$, upon the frame A. The perforation of gear $g^3$ covers a zone of free rotative contact at both sides of the plane of severance between the abutting shafts $S^1$, $S^2$ in such wise that each shaft may be rotated independently of the other, or they may be connected into one. The enclosing perforation of the gear $g^3$ is slightly enlarged immediately adjacent to the plane of severance of the abutting shafts $S^1$ $S^2$ for the reception of contact washers between their contiguous surfaces. Splined clutches $C^1$, $C^2$, adjacent to the hub-ends of the gear $g^3$ at opposite sides respectively, serve to connect said gear in rotation with the main shaft $S^1$ or the extension shaft $S^2$ or both as required. The gear $g^3$ is in constant mesh with an opposite loose gear $g^4$, on sleeve $S^4$, of the auxiliary shaft as will be explained later. Forward of the gear $g^3$, is a gear $g^5$, permanently affixed to shaft $S^1$, in constant mesh with a normally loose gear $g^6$, upon the sleeve $S^4$ of the auxiliary shaft. Adjacent to these are the forward principal bearings $b^2$ $b^2$ upon the frame A. The main bearings $b^1$, $b^2$ of the shafts are preferably of the straight roller type. Forwardly adjacent to the bearings $b^2$ $b^2$ is a permanent gear $g^7$ upon the main shaft, used only in reversing.

The auxiliary shaft $S^3$ is integral from its rear bearing $b^1$ forward to a case bearing $e$.

From its rear permanent gear $g^2$ forward it carries a loose sleeve $S^4$ enclosing a pilot bearing $b^5$ adjacent to said permanent gear $g^2$ and terminating forward in a spur gear $g^8$ in constant mesh with a similar gear $g^7$ upon the main shaft $S^1$ (these two last mentioned gears being used only in reverse motion). Adjacent to the permanent gear $g^2$ the sleeve is provided with a splined shifting clutch $c^3$ to engage the sleeve in rotation with the shaft $S^3$. Forward of this is a permanent gear $g^4$ in constant mesh with the gear $g^3$ of the main shaft $S^2$, and still forward is a loose gear $g^6$ in constant mesh with gear $g^5$ of the main shaft $S^1$ and provided with a sliding clutch $C^4$ to engage it in rotation with the sleeve $S^4$ and next forward are the case bearings $b^2$. In connection with these bearings the forward end of the auxiliary shaft $S^3$ is somewhat reduced in diameter to receive a case thrust bearing $e$.

The employment of two oppositely rotating bevel pinions $p^1$, $p^2$, simultaneously to drive the ring gear, with initial application of power to one or the other pinion as the case may be, results, practically, in a tendency to unequal distribution of load between the pinions which may be counteracted by provision of differential mechanism or by the simpler method of giving to the extension shaft $S^2$ a slight end play to allow a self-adjustment or change of the tooth contact pressure as between the bevel pinion $p^1$ and gear $g^1$ and ultimately with the other bevel pinion $p^2$. To this end I mount the main and extension shafts $S^1$ $S^2$ with a slight end play and secure to the abutting end of each shaft a disc $d$ of hardened steel with bronze washers $d^1$ $d^1$, and interpose between the discs $d$ a plurality of independent hardened rollers $d^2$, said discs, washers and rollers together constituting a thrust bearing which takes the pressure of contact whenever thrust action takes place. The slight end clearance allows the tooth-pressures between the opposite driving pinions $p^1$ $p^2$ to equalize themselves by the slight yielding of the driving pinion to the point of equal pressure on the teeth of both pinions. This end movement may be allowed on one or both of the shaft sections $S^1$ $S^2$. This holds good in all movements of the vehicle whether the power is delivered primarily through the bevel pinion $p^1$ or $p^2$.

The normal end thrusts of the gear-connections are minimized and practically eliminated by the use and arrangement of helically cut gears in such relation and tooth angles as to secure what may be termed "herring bone" effect, having in mind the principle that the direction of thrust in a driving gear opposite to that of a driven gear running in the same direction both gears having the same hand helix rotative direction. This is illustrated in Figures 2 to 6 inclusive. It will be observed that the spur gears $g^1$, $g^3$, $g^5$, of the main and extension shafts have teeth of similar inclination opposite to that of the teeth of bevel pinion $p^1$. While the teeth of the corresponding gears $g^2$, $g^4$, $g^6$, and also $g^8$, of the auxiliary shaft are inclined oppositely to those first mentioned and in the same direction as the teeth of pinion $p^2$.

In the figures of the drawing referred to, the transmission of power is indicated by direct and cross lines showing its course from shaft to shaft and gear to gear, with small arrows indicating at each gear the direction of thrust in each case. Thus in Figure 2 representing "low" gear, the course of power transmission from main shaft $S^1$ is to gear $g^5$; thence across to gear $g^6$; rearward to $g^4$; across to gear $g^3$; and rearward direct to pinion $p^1$ with a side branch from gear $g^1$ to gear $g^2$ and thence direct to pinion $p^2$. In this transmission as shown by the arrows, (see Fig. 2) gear $g^5$ thrusts rearward, being a driving gear, while gear $g^6$ being driven, thrusts forward; gear $g^4$ being a driving gear as to its companion gear $g^3$ thrusts backward. Thus as between these opposite intermeshing gears those on the auxiliary shaft counteract by thrust action in direction apart from each other while the main shaft gears counteract thrust action toward each other. Similar counteracting effect will be evident as between companion gears $g^1$, $g^2$ and the bevel pinions $p^1$, $p^2$, each set of opposite gears counteracting each the thrust action of the corresponding gear of the next in series.

In case of a reversal of torque as in running down hill and braking with the engine, all thrusts are reversed in direction, but substantially balance.

In the transmission as shown by the arrows (see Fig. 5) gear $g^5$ thrusts rearward, being a driving gear, while gear $g^6$ being driven, thrusts forward, gear $g^2$ being a driving gear, thrusts backwards, and its companion gear $g^1$ being a driven gear, thrusts forward. Pinion $p^1$ and gear $g^1$ both thrust forward and are balanced by the backward thrust of $g^5$. Pinion $p^2$ and $g^2$ both thrust backward and are balanced by the forward thrust of $g^6$.

The principle involved, of counteracting thrust action is illustrated in similar Figures 3, 4 and 6 which differ only in the relative changes in the course of transmission involved in change of speed, and will be evident without further detail of explanation.

It will be seen that the thrust actions throughout are thus confined to and neutralized by the relation of the moving elements to each other in their several contacts to the exclusion of all case-bearings for his purpose. The main thrust at the point of delivery of power through the driving pinions to the ring gear is absorbed by the self-adjusting equalization of load pressure upon the pinions permitted by the slight endwise movement of the primary engaging pinion and the shaft of which said pinion is the terminal. The intermeshing transmission gears on the parallel shafts have helically cut gear teeth "rights" and "lefts" respectively. In the construction and arrangement of the parts, the balancing normal of thrust action as between the several helically cut spur gears, is such that the thrust action of one pair of gears is balanced at one speed by a given set of gears and at a different speed by the other pair of gears brought into use.

It will be observed also that each pair of intermeshing gears is employed in more than one speed, thus minimizing the number of gears used in the system.

Several important advantages are realized among which are the following: The relatively increased strength of parts as gained by the division of power through two ultimate driving pinions, is of course obvious and has already been suggested; but to combine this structural feature with the various other elements of a transmission system involving different speeds without interfering with continuity of rotation of the pinions, presents a problem whose solution has not heretofore been accomplished.

In the present invention the speeds are more direct and employ a less number of gears in the same number of speed changes than is now the standard practice. Moreover the invention renders possible a practical overgeared speed,—that is, one in which the pitch-line velocities are not too high for efficient service. Also, it connects two shafts in rotation by helical cut gears, so that the relation of driving to driven gears may be reversed without imposition of extra strain upon the case or any of its bearings.

In addition to these is the realization in a standard motor-driven vehicle of the elimination of noise and clatter usually to be expected in a pluralization of speeds, and the substitution of efficient smooth and quiet running, enabling the vehicle to be used continuously at direct or high speed, due in part to the principle of opposing thrust by an opposite thrust; which carries with it the practical effect of "herring bone" balanced structure.

There is thus constituted a gear-system in which the power is divided in its ultimate application to the axle, through two parallel shafts, in equal moieties to and through two equal bevel pinions in mesh with the ring gear at opposite sides simultaneously. This of course reduces by one-half the stress upon the engaging teeth of the ring gear the bevel pinions $p^1$ $p^2$ and the spur gears $g^1$ $g^2$ with reduction of frictional wear.

It also provides for a gear ratio much greater than is otherwise practicable and thus dispenses entirely with screw propulsion as now employed in truck service.

I claim as my invention and desire to secure by Latters Patent of the United States:

1. A gear transmission of the character indicated, embodying a differential axle casing; a double bevel ring gear seated thereon; a main shaft and an independently rotatable extension thereof; a countershaft in parallel with said main and extension shafts; equal bevel pinions on the rear extremities of said extension and countershafts in constant driving relations with the ring gear; a spur gear having a hollow body and hub-extensions— the latter carried in case bearings supporting the gear body and the abutting shaft terminals embraced therein; and pilot bearings within the enclosure of the gear body for each abutting shaft terminal.

2. In a gear transmission system all gears of which are helically cut; the combination of a double bevel ring gear; initial drive shaft made in two parts; a combined thrust bearing and clutch forming a connection for the parts of said shaft; a secondary drive shaft; said drive shafts parallel and at right angles to the shaft of said ring gear; a terminal bevel pinion for each drive shaft engaging said ring gear at opposite sides in simultaneous driving relations; a plurality of gears for said shafts for driving said ring gear at varying rates of speed, so placed and mounted as to permit and require the delivery of power through both said terminal pinions upon the ring gear in each of said speeds; and to balance as between themselves the end thrusts of said double pinions at all speeds.

3. In a gear transmission system all gears of which are helically cut; the combination of a double bevel ring gear; an initial drive shaft made in two parts tandem; a combined thrust bearing and clutch forming a connection for the parts of said shaft permitting slight lost motion endwise; a secondary drive shaft; said drive shafts parallel and at right angles to the axis of said ring gear; a terminal bevel pinion for each drive shaft engaging said ring gear at opposite sides in simultaneous driving relations; a plurality of gears for said shafts for driving said ring gear at varying rates of speed, so arranged as to permit and require the delivery of power through both said terminal pinions upon the ring gear in each of said speeds; and to balance as between themselves the end thrusts of said double pinions at all speeds, and automatically equalize the tooth pressure and maintain equality of load between the two terminal pinions.

4. In a gear transmission system of the general character described all gears of which are helically cut; the combination of a differential axle-casing double bevel ring gear seated thereon; an initial drive shaft made in two parts; a combined thrust bearing and clutch forming a connection for the parts of said shaft; a secondary drive shaft; a normally loose sleeve for said secondary shaft; said drive shafts parallel and at right angles to the axis of said ring gear; a terminal bevel pinion for each drive shaft engaging said ring gear at opposite sides in simultaneous driving relations; a plurality of gears for said shafts and sleeve for driving said ring gear at varying rates of speed, so placed and mounted as to permit and require the delivery of power through both said terminal pinions upon the ring gear in each of said speeds; and to balance as between themselves the end thrusts of said double pinions at all speeds, and sufficient end play in said initial drive shaft to automatically equalize the tooth pressure and maintain equality of load between the two terminal pinions.

5. In a gear transmission system of the character indicated, having a divided main-shaft, and a gear body formed to embrace the said shaft at the zone of separation and support and maintain the parts as independent elements in rotation by its own support upon the chassis or supporting frame, a thrust bearing upon each of the contiguous shaft terminals adapted to absorb thrust in either direction of rotation.

6. In a gear transmission of the character indicated, in combination with a main driving-shaft in two parts independently rotatable in tandem relations, and carried at the zone of their abutting contact within the axial orifice of a spur-gear carried in case bearings; a bearing washer or washers secured at the contiguous shaft-ends and constituting a thrust bearing.

7. In a power transmission system of the character indicated, a main power shaft, a tandem extension thereof; a spur gear structure with hollow center constituting a rotative support; thrust bearings at the contiguous ends of the main and extension shafts, the construction of the said spur gear in two duplicate parts substantially as shown to facilitate and cheapen the structure and afford ready access to the interior thereof for renewal of minor parts.

8. In a transmission gear system the combination of a plurality of shafts; two driving pinions one upon each of two shafts; a double ultimately driven bevel gear in constant mesh with said driving pinions simultaneously; and a plurality of change gears on said shafts for securing varying rates of speed, said gears being so placed and mounted as to permit and require the double drive of the pinions upon the ultimate driven gear in each of said speeds, all of said gears being helical.

9. In a transmission gear system, the combination of a plurality of shafts, two driving pinions one upon each of two shafts, a double ultimately driven bevel gear in constant mesh with said driving pinions simultaneously; and a plurality of change gears in such location and inter-relation as that power may be delivered initially through one or the other of said ultimate driving pinions, while preserving continuity of rotation of both, all of said gears being helical.

10. In a transmitting system of the character indicated, a main shaft; an axially abutting independently rotatable extension thereof; a counter-shaft in parallel with said main and extension shafts; a main central spur-gear axially embracing and constituting a bearing for the abutting terminals of said main and extension shafts; and a plurality of transmitting gears located as opposites in location in fast or loose connection upon opposite shafts, and made available in the variable speed relation by clutches severally connecting them for driving rotation with the shaft upon which the gear is located.

11. In a transmission system of gearing, in combination with a main driving shaft in constant rotation; a rear abutting extension thereof independently rotatable; an integral auxiliary shaft in parallel with said main and extension shafts; intermeshing equal permanent gears upon the extension and auxiliary shafts; a normally loose sleeve upon the auxiliary shaft and connectible therewith in rotation as desired; a spur gear normally loose upon said sleeve in mesh with a corresponding permanent gear upon the main shaft.

In testimony whereof I have hereunto set my hand in presence of two subscribing witnesses.

WILLIAM FRANKLIN PENROD.

Witnesses:
CARL PHARES,
NORMA D. BERGER.